US006487627B1

(12) United States Patent
Willke et al.

(10) Patent No.: US 6,487,627 B1
(45) Date of Patent: Nov. 26, 2002

(54) METHOD AND APPARATUS TO MANAGE DIGITAL BUS TRAFFIC

(75) Inventors: Theodore L. Willke, Tacoma; Warren R. Morrow, Steilacoom, both of WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,539

(22) Filed: Dec. 22, 1999

(51) Int. Cl.[7] .............................................. G06F 13/00
(52) U.S. Cl. ....................................... 710/306; 710/305
(58) Field of Search ................................. 710/100, 305, 710/306, 307, 310, 311, 312, 313, 314, 315, 52; 712/200, 205, 206, 207

(56) References Cited

U.S. PATENT DOCUMENTS

| | | | | |
|---|---|---|---|---|
| 5,974,456 A | * | 10/1999 | Naghshineh et al. ........ 709/223 |
| 6,185,672 B1 | * | 2/2001 | Trull ........................... 712/206 |
| 6,237,073 B1 | * | 5/2001 | Dean et al. .................. 711/118 |
| 6,237,088 B1 | * | 5/2001 | Zaidi ........................... 712/239 |
| 6,247,114 B1 | * | 6/2001 | Trull ........................... 712/202 |
| 6,266,744 B1 | * | 7/2001 | Hughes et al. ............... 711/123 |
| 6,330,630 B1 | * | 12/2001 | Bell ............................. 710/55 |
| 6,349,380 B1 | * | 2/2002 | Shahidzadeh et al. ...... 711/205 |
| 6,393,536 B1 | * | 5/2002 | Hughes et al. ............... 711/118 |
| 6,405,305 B1 | * | 6/2002 | Meier et al. ................. 708/510 |

* cited by examiner

*Primary Examiner*—Xuan M. Thai
(74) *Attorney, Agent, or Firm*—Blakley, Sokoloff, Taylor & Zafman LLP (57) ABSTRACT

A method includes transmitting packets on a bus and maintaining a number of the packets in-flight on the bus according to a number of active streams for the bus.

15 Claims, 9 Drawing Sheets

| Total Active Streams for Bridge | In-Flight Target Per Stream | | | |
|---|---|---|---|---|
| | One or More Active Streams on One Shared Bus in System | One or More Active Streams on Two Shared Buses in System | One or More Active Streams on Three Shared Buses in System | One or More Active Streams on Four Shared Buses in System |
| 0 | 3 | 3 | 2 | 1 |
| 1 | 3 | 3 | 2 | 1 |
| 2 | 2 | 2 | 1 | 1 |
| 3 | 1 | 1 | 1 | 1 |
| 4 | 1 | 1 | 1 | 1 |

METHOD AND APPARATUS TO MANAGE DIGITAL BUS TRAFFIC

BACKGROUND

1. Field

The present invention relates to managing digital bus traffic.

2. Background Information

Modem electronic devices often comprise signal paths known as buses for propagating signals between components of the device. A device may comprise multiple buses, known as local buses, each coupled to one or more components. Signals from two or more local buses may merge onto another bus, known as a shared bus. Signals from multiple local buses, or multiple shared buses, may also merge into a component of the device, such as a switch, router, or bridge component. As the signal traffic on the buses increases, congestion may begin to occur on the shared bus or within the component where the signals merge.

Many types of signals may contribute to bus signal traffic (e.g. bus signal bandwidth), including read request signals, write request signals and read return signals. Read request signals are signals generated by components to request the return of data signals from another component (the target). Often this other component is a memory device. Write request signals are signals generated by components to transmit data signals to other components, again typically a memory. Read return signals are the signals generated by components in response to read request signals, to return data to the requesting component. Of course, many other types of signals are possible on buses as well.

Figure 4:
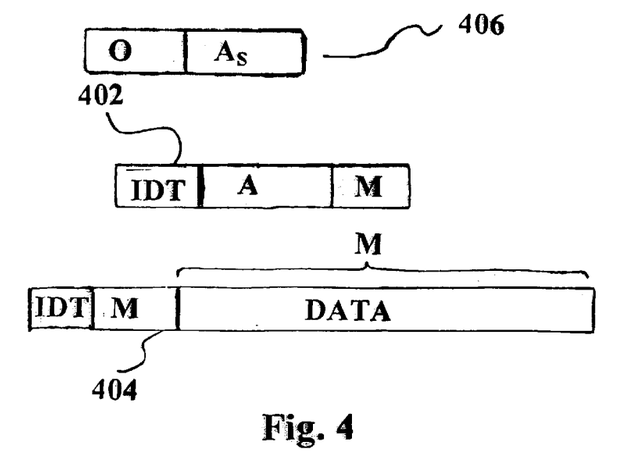
FIG. 4 shows embodiments of read request signal, read request packet, and read return packet in accordance with the present invention.

A component known as a bus bridge may be responsible for merging signals from two or more local buses onto a shared bus. A component on one of the local buses may submit a read request signal to the bus bridge. As shown in FIG. 4, a read request signal 406 may comprise an address (field $A_s$). Of course, the read request signal 406 from the component may comprise substantially more information (indicated by field O) as well which is not shown so as not to obscure the present discussion. The address $A_s$ may identify a starting address within the target component from which to read data. Note that in one embodiment the read request signal may not indicate the number of bytes to read. Instead, the bridge may generate read request packets 402 to read data beginning at the starting address $A_s$, until a time when the component indicates it is no longer interested in accepting returned data, or simply stops accepting returned data. In another embodiment, the request signal 406 may include a number of sequential bytes to read from the address $A_s$.

In response to receiving the read request signal 406 from the component on the local bus, the bus bridge may generate multiple read request packets 402 to fulfill the request. Similar to the read request signal 406 from the component on the bus, the read request packet 402 may an address A and a request size M. Read request packet may also include an identifier IDT which may facilitate routing of the request packet 402 and ordering of the read return packets 404 which are produced in response. Of course, the read request packet 402 from the component may comprise substantially more information as well which is not shown so as not to obscure the present discussion. The address A may indicate an address in the target component from which to read data. Initially this may be the same starting address $A_s$ specified in the read request signal, but subsequently may comprise a different address as data is read sequentially from the target component. The size M may indicate a number of sequential bytes to read from the address A.

Data signals may be returned from the target component by way of read return packet 404. Read return packets 404 may comprise the routing identifier IDT, the number of bytes of data returned (M), and M bytes of DATA. The bridge component may buffer and forward read return packets 404 to the component on the bus which submitted the read request signal 406, until the component indicates that it will no longer accept returned data, or stops accepting returned data.

The bridge device may transmit several read request packets 402 before receiving the first read return packet 404. This behavior is known as prefetch and tends to improve the performance of the device by maintaining signal bandwidth on the bus at levels close to the maximum levels which the bus is capable of sustaining (e.g. improving bus bandwidth efficiency).

One disadvantage of prefetch is that a number or read return packets may arrive for the component after it has indicated that it will no longer accept returned data. Due to prefetch, the bus bridge may have transmitted additional read request packets 402 to the target component which result in returned data which the requesting component does not accept. The additional read return packets are known as overfetch. Overfetch is a side effect of prefetch and tends to waste bandwidth on the shared bus.

Efficient operation of the shared bus may be achieved by utilizing prefetch while attempting to minimize overfetch. Traditional approaches have adjusted the number of prefetched packets according to buffer capacity in the bus bridge component. However, this approach may not adequately compensate for the negative impact of overfetch on bus efficiency.

SUMMARY

A method includes transmitting packets on a bus and maintaining a number of the packets in-flight on the bus according to a number of active streams for the bus.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

DETAILED DESCRIPTION

The embodiments described herein are merely illustrative, and one skilled in the art will appreciate that numerous modifications can be made which nonetheless fall within the scope of the present invention.

Figure 1:
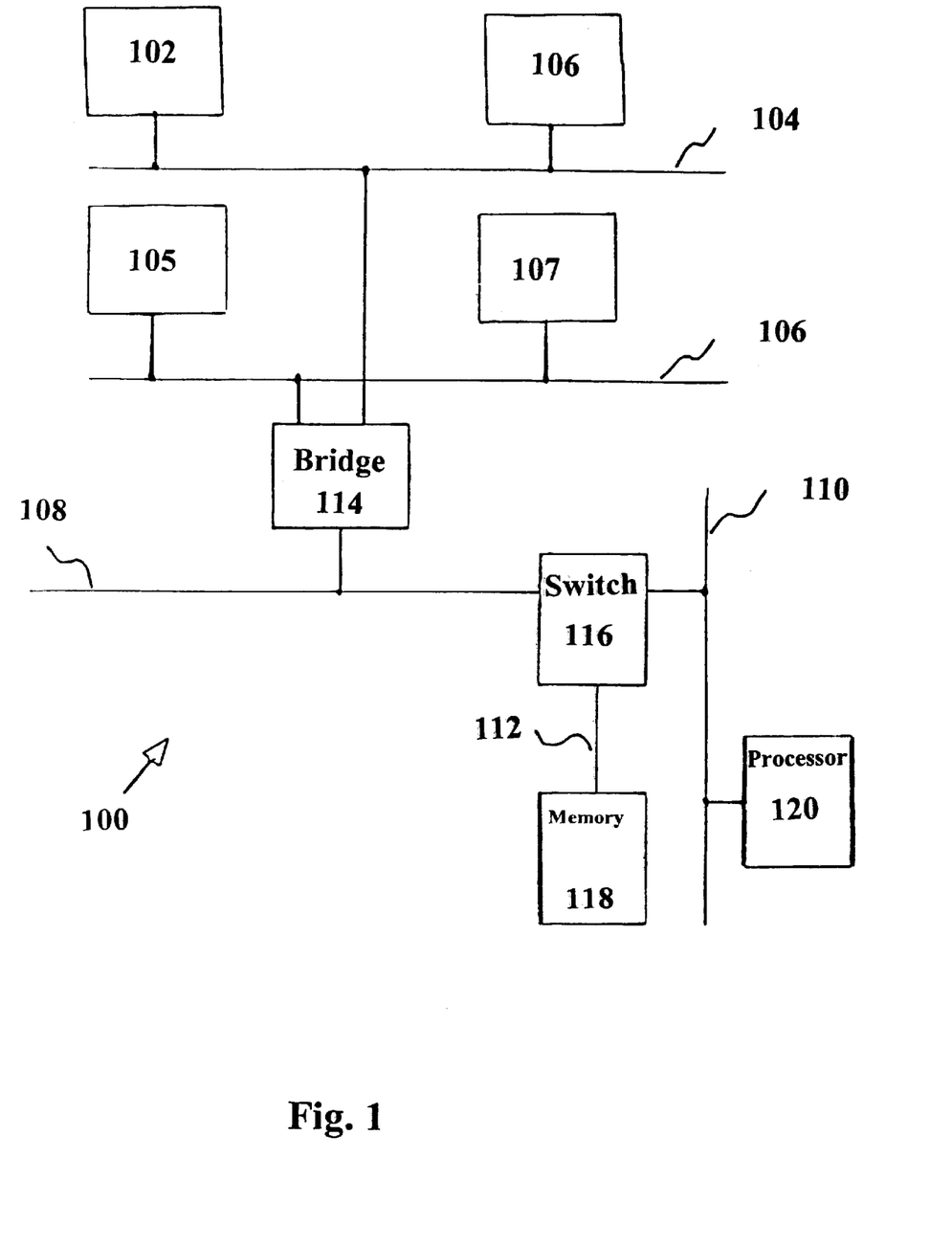
FIG. 1 is a block diagram illustrating one embodiment of a device in accordance with the present invention.

FIG. 1 is a block diagram illustrating one embodiment 100 of a device in accordance with the present invention. Device comprises two local buses 104 and 106. Components 102 and 103 are coupled to local bus 104, and components 105 and 107 are coupled to bus 106. Each of components 102, 103, 105, 107 may transmit read request signals to bus bridge 114. Bridge 114 merges read request signals on buses 104, 106 onto shared bus 108. In one embodiment local buses 104 and 106 are Peripheral Component Interface buses operating at 66 MHz frequencies. See the PCI Local Bus Specification, Product Version, revision 2.2, published Dec. 18, 1998 for more details. Components 102, 103 105 and 107 may be devices such as Gigabit Ethernet Cards, Fiber Channel Disk Controllers, Digital Video Disk players, CD ROM drives, digital sound hardware, and video cameras, to name just a few of the nearly limitless possibilities.

Bridge 114 may accept read request signals from the buses and may generate read request packets on shared bus 108. In one embodiment, shared bus 108 is coupled to a switch 116 which switches the read request packets to a memory component 118 by way of memory bus 112. Memory 118 responds to read request packets with read return packets on memory bus 112. Switch 116 switches the read return packets to shared bus 108, from which they are received and buffered by bridge 114. Bridge 114 returns the read return packets to the requesting component via one of local buses 104 and 106. In one embodiment involving PCI local buses, bridge returns the read return packets to the requesting component in response to a query from the requesting component. A read request packet is said to be "in-flight" from the time the read request packet is transmitted by the bridge 114 onto shared bus 108 until the time the corresponding read return packet is received (or begun to be received) by the bridge 114.

Herein, the term "stream" shall refer to one or more pending read request signals from a component to bridge 114. In one embodiment, a stream results each time a read request signal is provided to the bridge with a starting address which is not address contiguous with the address of the last byte of a prior read request signal from the same component. Several examples will help clarify the circumstances that result in streams coming into existence.

EXAMPLE 1

Component 102 requests to read 128 bytes (0x0010 bytes, where each digit of the address is four bits) from memory 118 beginning at address 0xffff:0000. This creates a new active stream.

EXAMPLE 2

Component 102 next requests to read 100 bytes from memory 118 beginning at address 0xffff:0001. This creates a new active stream, whether or not the first request is still pending, because the second read request is not address contiguous with the last byte of the first.

EXAMPLE 3

Component 103 requests to read 128 bytes from memory 118 beginning at address 0x0000:1000. This creates a new active stream.

EXAMPLE 4

Component 103 next requests to read another 128 bytes from memory 118 beginning at address 0x0000:1010. This does not create a new active stream, whether or not the first request is still pending, because the second read request is address contiguous with the last byte of the first.

EXAMPLE 5

Component 102 requests to read 128 bytes from memory 118 beginning at address 0xffff:0000. Component 103 requests to read 128 bytes from memory 118 beginning at the same address. This creates two new active streams.

When the component which produced a read request signal is accepting the returned data, or actively waiting for returned data, the stream is said to be "active".

In one embodiment, a processor 120 may also be coupled to switch 116 by way of a processor bus 110. Processor 120 may send and receive signals to memory 118 by way of processor bus 110, switch 116, and memory bus 112. Processor may also send and receive signals from components 102, 103, 105, and 107 by way of processor bus 110, switch 116, and shared bus 108.

Figure 2:
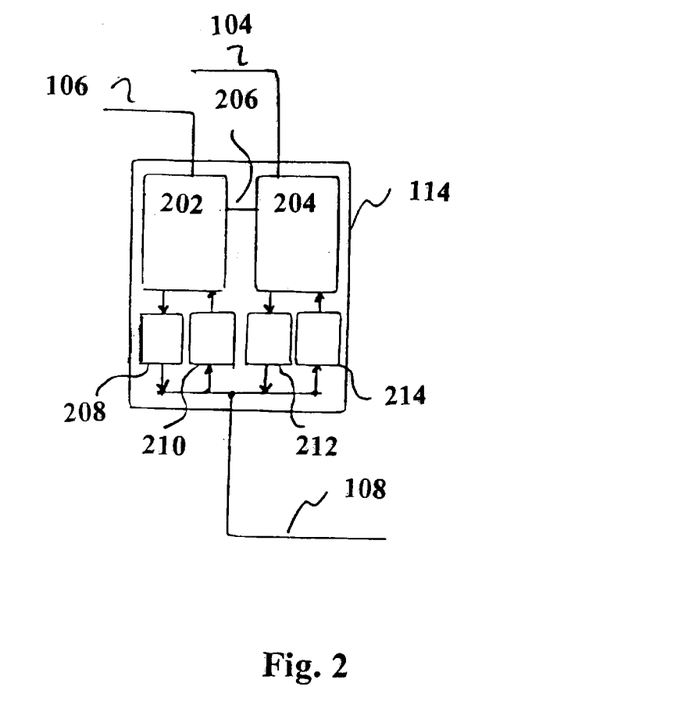
FIG. 2 shows an embodiment of bridge in accordance with the present invention.

FIG. 2 shows an embodiment of bridge 114 in accordance with the present invention. Embodiment 114 comprises two prefetch units 202 and 204. First prefetch unit 202 is responsible for servicing read request signals received by way of bus 106. Second prefetch unit 204 is responsible for servicing read request signals received by way of bus 104. Read request signals may be serviced by generating read request packets on shared bus 108. First prefetch unit 202 has a buffer 208 for queuing read request packets to shared bus 108 and a buffer 210 for receiving and buffering corresponding read return packets. Second prefetch unit 204 has a buffer 212 for queuing read request packets to shared bus 108 and a buffer 214 for receiving and buffering corresponding read return packets.

Each prefetch unit may operate more or less independently of the other. However, in accordance with the present invention the prefetch units may exchange signals by way of bus 206. These signals may identify a number of active streams being serviced by each of the prefetch units. Such signals are herein referred to as "traffic hints".

Figure 3:
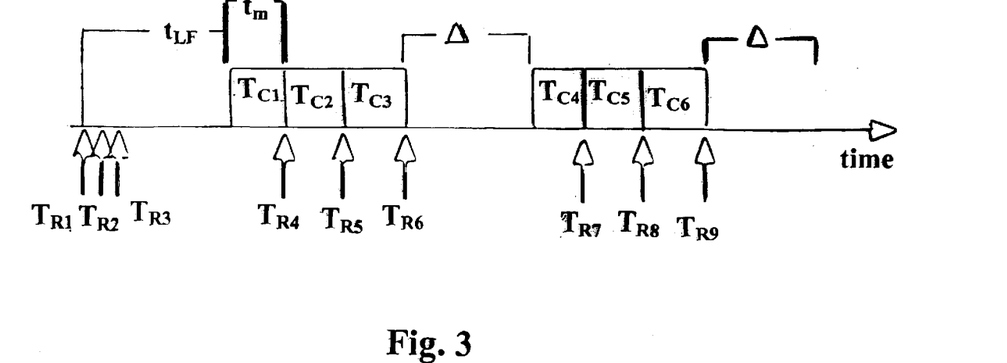
FIG. 3 shows a timeline in accordance with an embodiment of the present invention.

FIG. 3 shows a timeline in accordance with one embodiment of the present invention. The timeline illustrates the timing of read request packets and read return packets for a single stream on shared bus 108. The read request packets may be generated by one of the prefetch units in response to receiving a read request signal from a component on one of the local buses. The prefetch unit generates a burst of three read request packets at times $T_{R1}$, $T_{R2}$, and $T_{R3}$. Thus, there are initially three read request packets in-flight (e.g. the prefetch count is three). Of course, three is merely the number chosen to illustrate this particular embodiment. The first read return packet is received at time $T_{R4}$, at a time $t_{LF}$ after $T_{R1}$ (the time when the first read request packet was transmitted). The time $t_{LF}$ may be referred to as the "round trip latency" of the bus and is a function of the bus speed, the response times of the target component of the read request, signal switching times, and other factors. The time $t_M$ is the time it takes to transmit the M data bytes of the read return packet. So as not to obscure the present discussion, the time it takes to transmit the read request packets and the headers of the read return packets is assumed to be relatively small compared with time $t_M$. Also, in many modern computing devices the bus bandwidth attributable to write requests is relatively small relative to the bus bandwidth arising from read returns. Thus, the discussion hereafter focuses on reads and read returns.

Upon receiving the first read return packet, the prefetch unit may transmit another read request packet. Thus, three read request packets remain in-flight. Additional read return packets are received at times $T_{R5}$ and $T_{R6}$, and in response additional read request packets are launched, maintaining the in-flight count at three. A period $\Delta$ of inactivity on the shared bus 108 may then occur. This period may be referred to as "dead cycles". During this period of inactivity, which results from the period $t_{LF}$ following the initial burst of read request packets, no read return packets are received. Additional read return packets are received at times $T_{R5}$ and $T_{R6}$, and in response additional read request packets are launched, maintaining the in-flight count at three. Additional read return packets are received at times $T_{R7}$, $T_{R8}$, and $T_{R9}$. In response, additional read request packets are launched, maintaining the in-flight count at three. Another period $\Delta$ of inactivity on the shared bus 108 may follow the transmission of the read request packet at $T_{R9}$.

As the time $\Delta$ decreases, the bus 108 is utilized more efficiently because there are fewer "dead cycles" during which no signals are transmitted over the bus 108. The relationship between the time $\Delta$, the in-flight read request packet count N, and the number of bytes in the read return transactions may approximately be defined by equation 1.

$$\Delta = t_{LF} - \frac{M(N-1)}{f_0} \quad (1)$$

Here M is the read return byte count, $f_0$ is the maximum data frequency of the shared bus 108 for a given value of M, and N is the in-flight read request packet count. The bus 108 operates at maximum capacity when $\Delta$ is zero. For positive $\Delta$, the bus 108 is operating at less than full capacity and for negative $\Delta$ the bus 108 is (theoretically) operating above capacity, in which case buffering may be employed to retain read request packets and read return packets when the bus is not immediately available to transfer the packets.

Bus utilization efficiency may be characterized by equation 2.

$$BW_{useful} = \frac{S}{S + (M \cdot N)} \left( \frac{1}{\frac{1}{f_0} + \frac{\Delta}{M \cdot N}} \right) \quad (2)$$

Here $BW_{useful}$ is the bus bandwidth utilized by read return packets which are accepted by the requesting component, e.g. read return packets which are not overfetched. Symbol S represents the amount of data retrieved from the target component before the requesting component no longer accepts returned data. Note that as S approaches infinity, $BW_{useful}$ approaches $f_0$, e.g. wasted bandwidth due to overfetch is reduced to zero because the requesting device never stops accepting returned data.

Given values of M, N, $f_0$, and S, setting $\Delta$ to zero in equation 2 may determine $BW_{useful}$ for a particular implementation. For example, an implementation may have (on average) S=4 KB, $f_0$=133 MHz (on a 16-bit "double pumped" bus), $t_{LF}$=50–70 clock cycles (one clock cycle=1/133,000,000 seconds), N=3, M=128 bytes. Experimentation has shown that providing these values of N, M, and $f_0$ in equation 1 may actually yield a $\Delta$ which is slightly negative. Due to factors not present in equation 1 (such as the "bursty" nature of signal traffic on the bus 108) a slightly negative value of $\Delta$ may actually correspond more closely to full bus utilization than a zero value. However, a zero value of $\Delta$ should be used when computing $BW_{useful}$ in equation 2.

Figure 9:
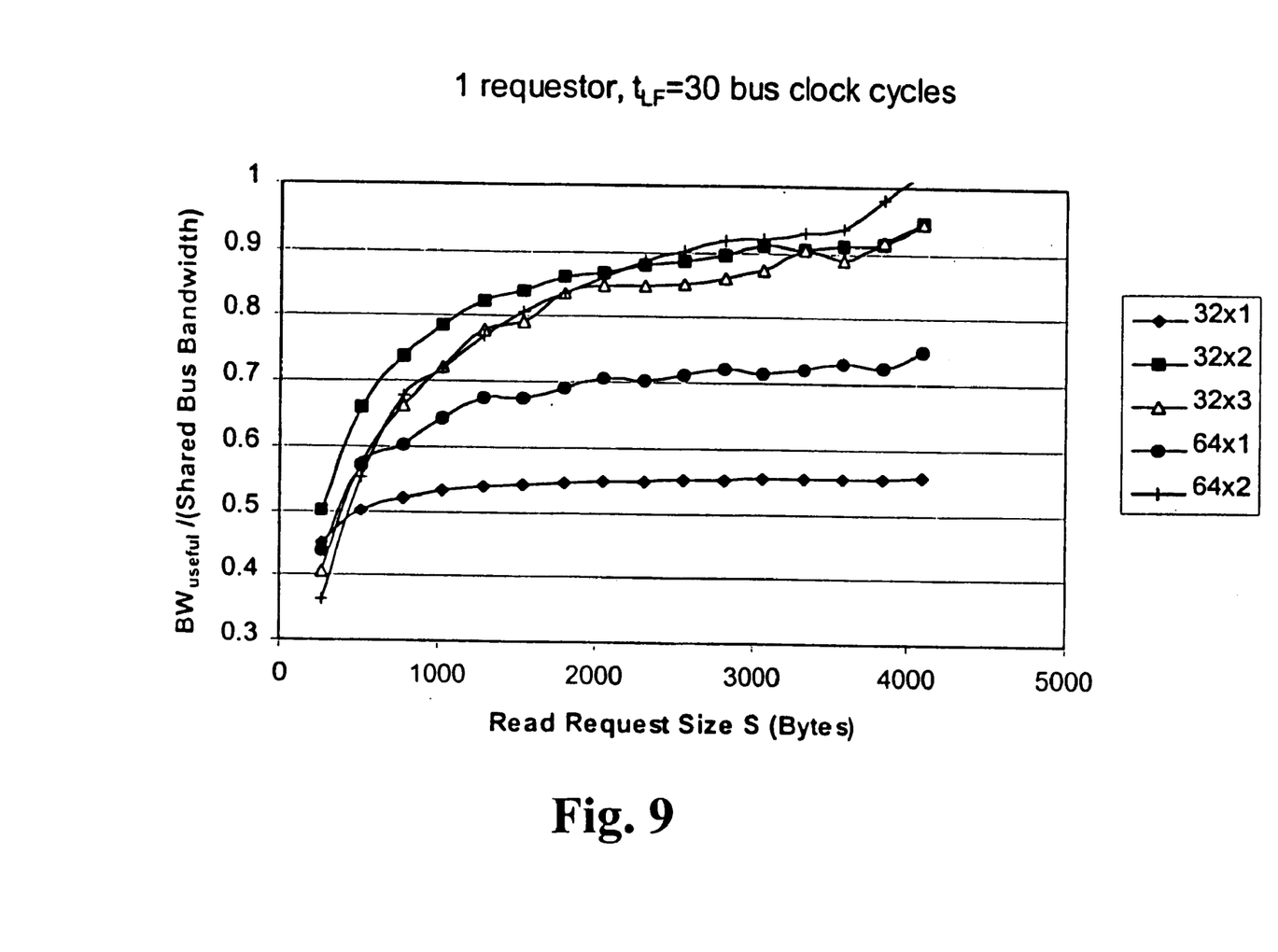
FIG. 9 shows a plot of $BW_{useful}$ in accordance with an embodiment of the present invention.
Figure 10:
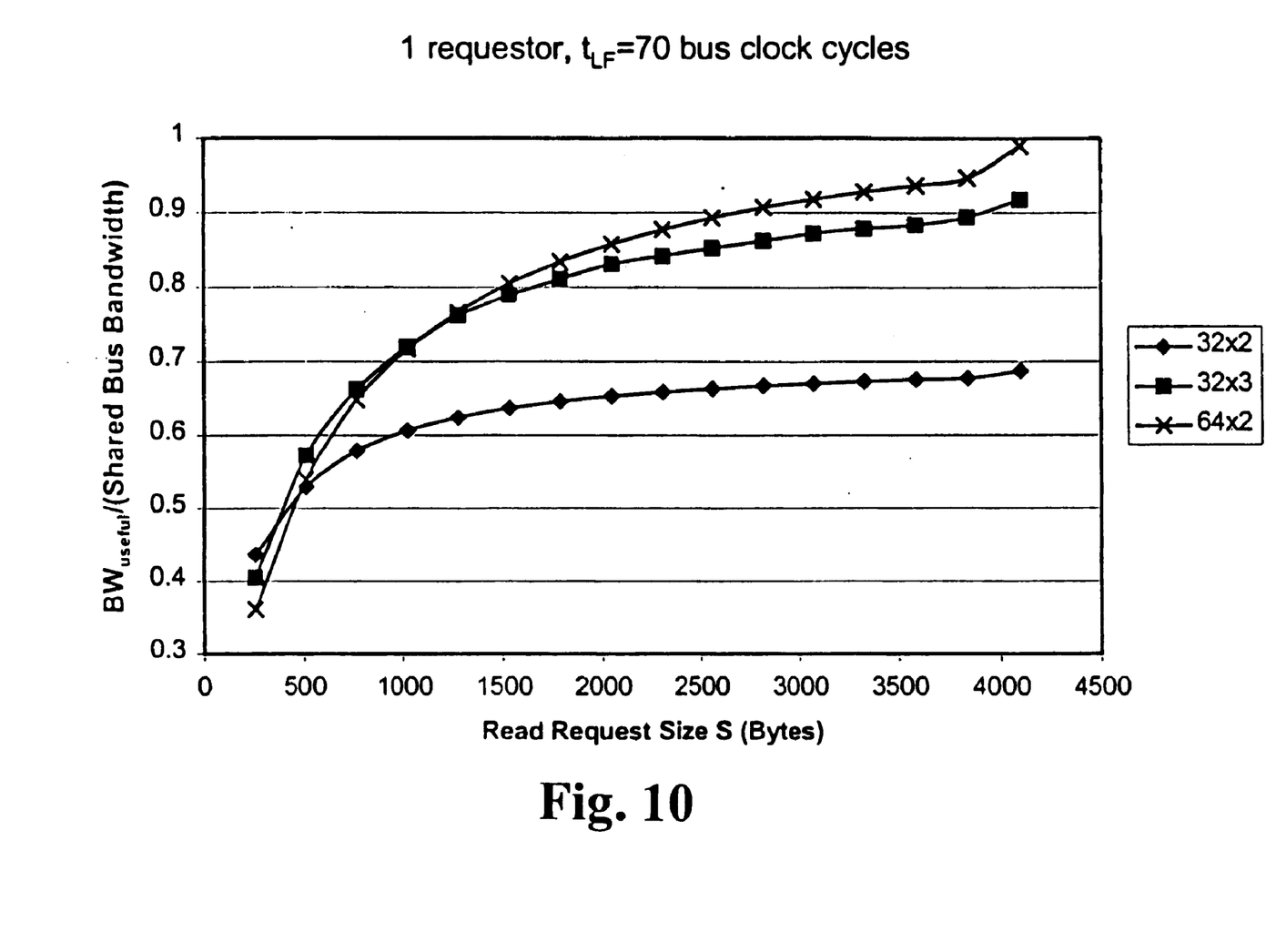
FIG. 10 shows a plot of $BW_{useful}$ in accordance with another embodiment of the present invention.

Equation 2 demonstrates that the value of $BW_{useful}$ tends to increase as S approaches infinity. FIG. 9 shows a plot of $BW_{useful}$ versus S for different combinations of M and N in accordance with an embodiment of the present invention. The legend has the format M×N. e.g. the left hand symbol is M and the right hand symbol is N. In FIG. 9 the $t_{LF}$ is 30 bus clock cycles. FIG. 10 shows a plot of $BW_{useful}$ versus S for different combinations of M and N in accordance with another embodiment of the present invention in a device where $t_{LF}$ is 70 bus clock cycles. Both figures apply to a shared bus operating at a frequency of 133 MHz with a single active stream (a single requestor, e.g. a single read request signal submitted to the bridge 114). In both figures, $BW_{useful}$ tends to increase with S.

Figure 11:
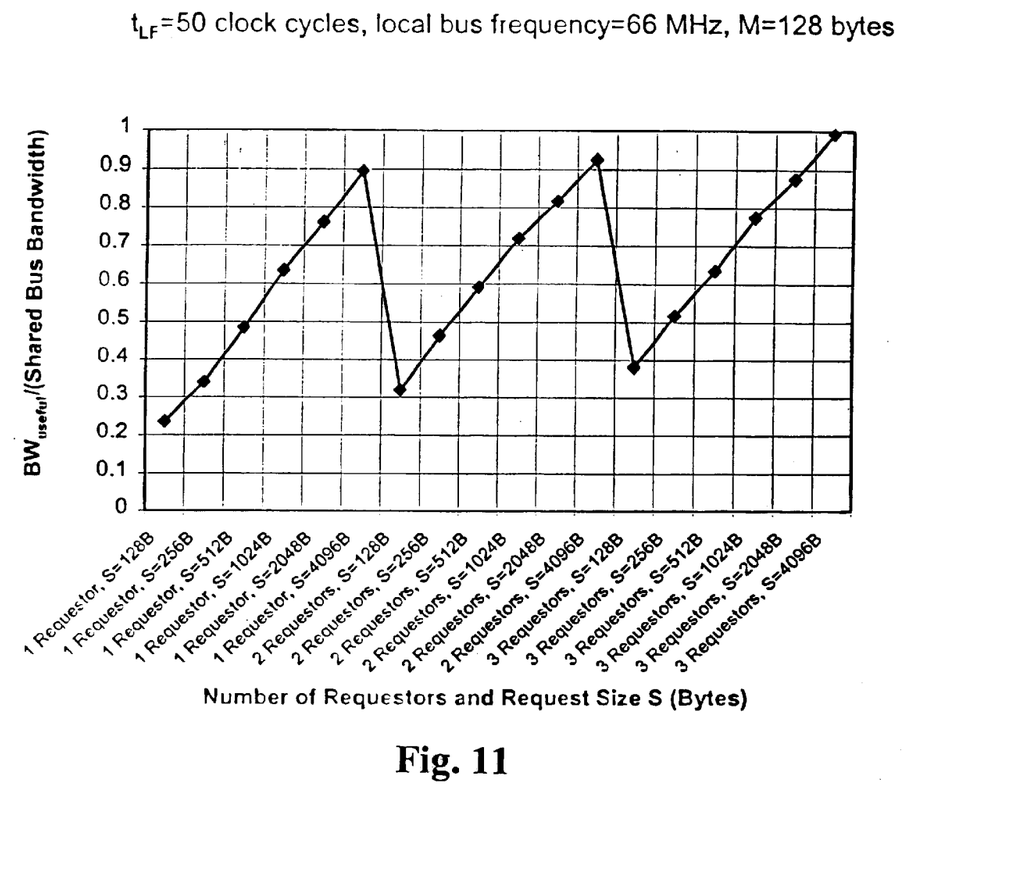
FIG. 11 shows a plot of bus bandwidth utilization efficiency according to an embodiment of the present invention.
Figure 12:
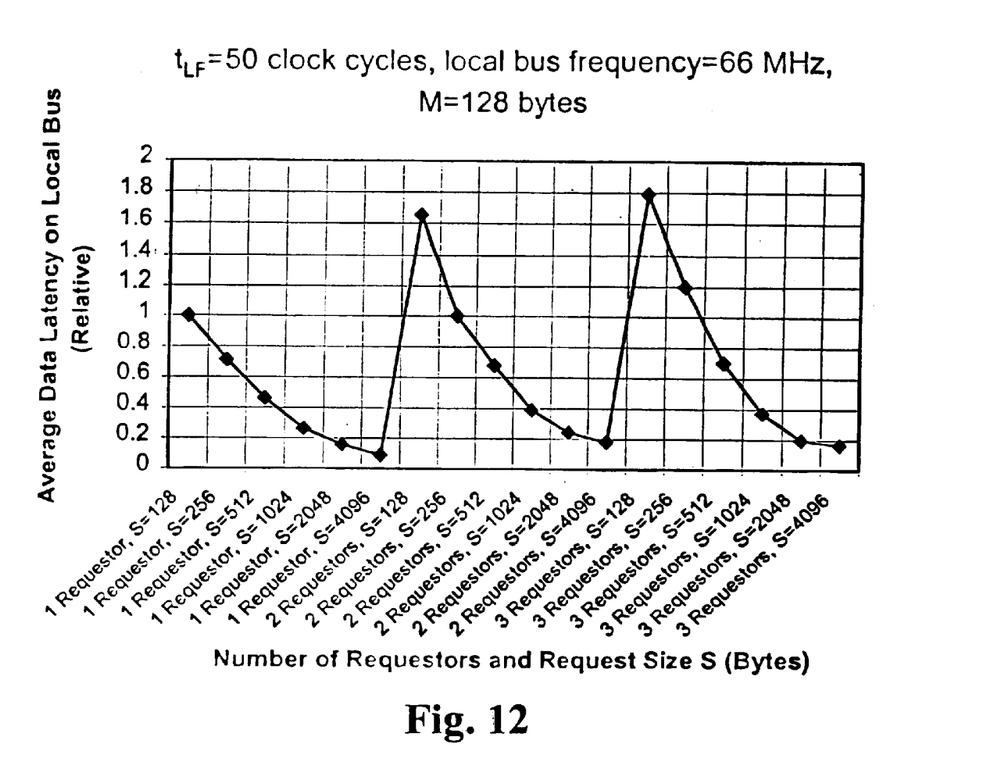
FIG. 12 shows a plot of relative data latency on the local buses according to an embodiment of the present invention.

The negative impact of overfetch on bandwidth efficiency increases with the number of in-flight packets per stream. In accordance with an embodiment of the present invention, the in-flight count per stream may be reduced as the number of active streams increases, which reduces the negative impact of overfetch without substantially impacting bus bandwidth utilization efficiency. FIG. 11 shows a plot of bus bandwidth utilization efficiency (defined as $BW_{useful}$/shared bus bandwidth) for different combinations of active stream count (requesters) and average S, according to an embodiment of the present invention. For a given number of active streams, bandwidth utilization efficiency increases as S increases. For a fixed value of S, efficiency also increases as more active streams are added. High efficiency is achieved for all active steam counts where S is relatively high. FIG. 12 shows a plot of relative data latency on the local buses for different combinations of active stream count (requestors) and average S, according to an embodiment of the present invention. Data latency is the average amount of time the requesting component waits to receive each byte requested, and is a well-known metric of performance. The plot in FIG. 12 has been normalized to the latency values of an embodiment with a single stream and average S of 128 bytes. Low latency is achieved for all active steam counts where S is relatively high. The higher efficiencies and lower latencies are made possible by adjusting the in-flight packet count per stream according to the number of active streams, in a manner described below.

In accordance with the present invention, in order to maximize $BW_{useful}$, prefetch units 202 and 204 may attempt to maintain in the in-flight count per active stream according to the total number of active streams serviced by the prefetch units. Each prefetch unit is made aware of the number of active streams serviced by the other by way of traffic hints passed over bus 206. Each prefetch unit may add the number of active streams serviced by the other to the number of active streams that it is presently servicing to generate the total number of active streams in service. Each prefetch unit may then adjust the in-flight packet count per stream, if necessary, according to the total number of active streams.

A lookup table may be utilized for this purpose. An embodiment 600 of such a lookup table is shown in FIG. 6.

Figure 6:
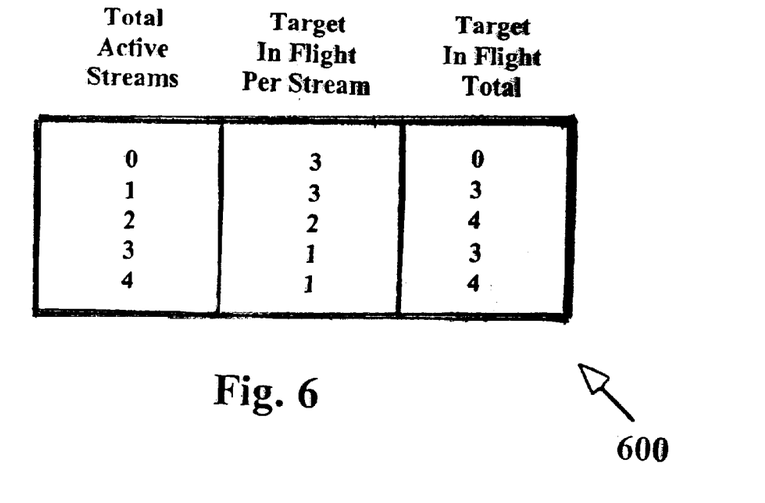
FIG. 6 shows an embodiment of a lookup table in accordance with the present invention.

Referring to FIG. 6, column one represents the total number of active streams. Dormant streams are not included in the count. The second column represents the target in-flight read request packet count per stream. This number represents the number of read request packets each prefetch unit will attempt to maintain per active stream. The third column represents the total number of in-flight read request packets the prefetch units attempt to maintain. The numbers in column three may be computed by substituting the M and $t_{LF}$ values for the particular implementation into equation 1, setting is Δ to a slightly negative value to achieve high $BW_{useful}$, and solving for N. The numbers in column three should equal the product of the numbers in columns one and two; therefor, some rounding may be required to the computed value of N before placing it into column three of the table in FIG. 6.

Figure 7:
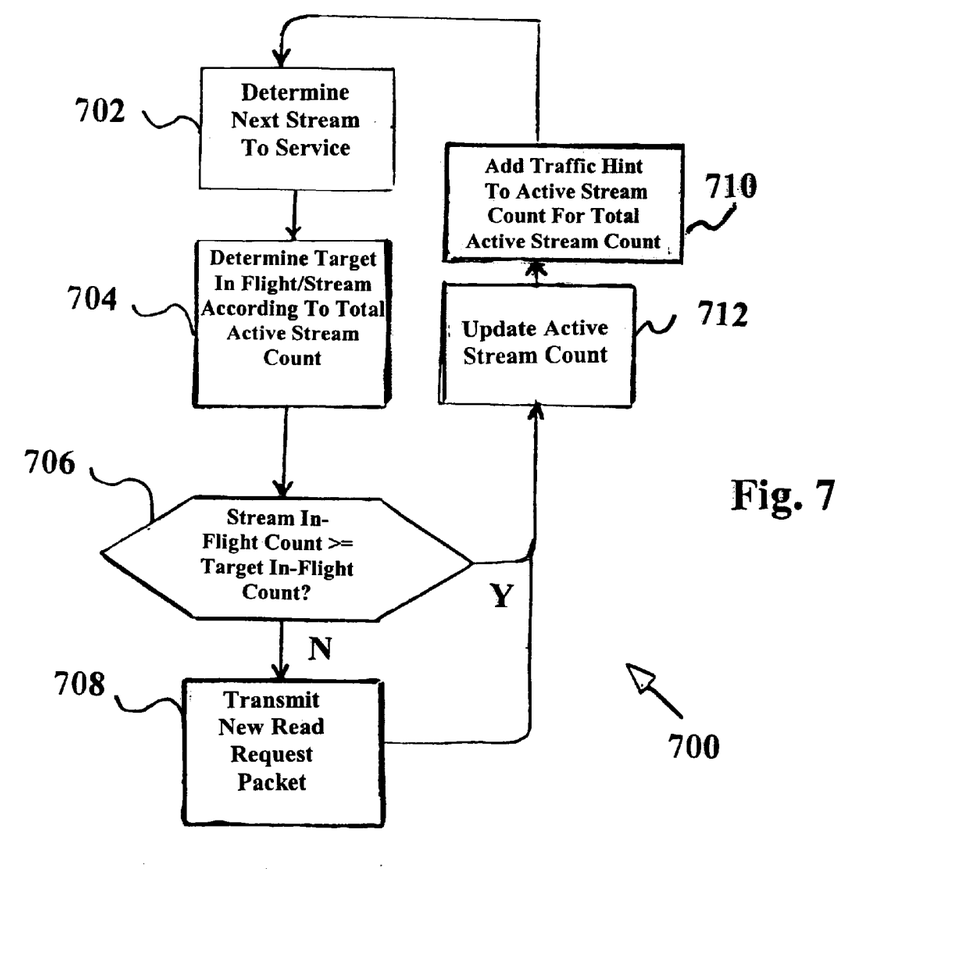
FIG. 7 shows an embodiment of a method in accordance with the present invention.

FIG. 7 shows an embodiment 700 of a method in accordance with the present invention. The method embodiment 700 may be performed by each prefetch unit in the bridge 114. At 702 the next stream for the prefetch unit to service is determined. This becomes the current stream. The target in-flight read request count per stream is determined at 704. At 706 it is determined whether the in-flight count for the current stream is greater than or equal to the target in-flight count for each stream. The target in-flight count is determined from the table in FIG. 6 (column two), corresponding to the total number of active streams the bridge 114 is servicing (column one). If the in-flight count for the stream is greater than or equal to the target in-flight count, the active stream count is updated, if necessary (712). Traffic hints from other prefetch units in the bridge 114 are added to the active stream count for the prefetch unit at 714, to obtain the total active stream count.

If the in-flight count for the stream is not greater than or equal to the target in-flight count, a new read request packet is transmitted for the stream (714) before the active stream count is updated (712).

Figure 5:
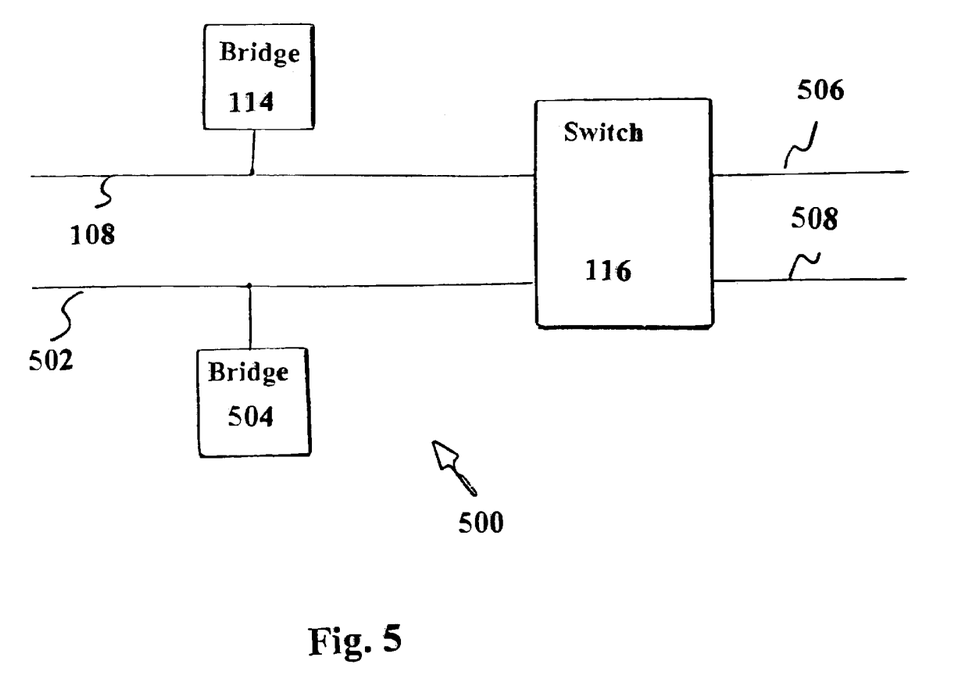
FIG. 5 is a block diagram illustrating an embodiment of a system in accordance with the present invention.

FIG. 5 is a block diagram illustrating an embodiment of a system in accordance with the present invention. First bridge 114 is coupled by way of first shared bus 108 to switch 116. A second bridge 504 is coupled by way of a second shared bus 502 to switch 116. Switch 116 may be coupled to other shared buses 506 and 508 as well. Although switch 116 is coupled to four shared buses in total, switch 116 may be designed such that its bandwidth is equal to that of only two shared buses. In other words, switch 116 is capable of switching up to $2*f_0$ of signal traffic, however, up to $4*f_0$ of signal traffic may potentially be applied to switch 116. Therefor, bandwidth on the four shared buses should be managed such that not much more than $2*f_0$ of sustained signal traffic is applied to switch 116. Of course, buffering in the switch could allow it to handle short bursts of traffic exceeding $2*f_0$ but only for a relatively moderate duration of time.

In FIG. 5, each bridge may service a number of active streams on the shared bus to which they are coupled. First bridge 114 may transmit a traffic hint packet to second bridge 504, by way of bus 108 through switch 116 to bus 502. Likewise, second bridge 504 may transmit a traffic hint packet to first bridge 114, by way of bus 502 through switch 116 to bus 108. Each bridge may adjust its target in-flight packet count per stream according to the traffic hint received from the other bridge, such that the combined bandwidth on all shared buses does not substantially exceed bandwidth of switch 116 for sustained periods. The per stream in-flight targets may be determined from a table such as the table embodiment 800 illustrated in FIG. 8.

Figure 8:
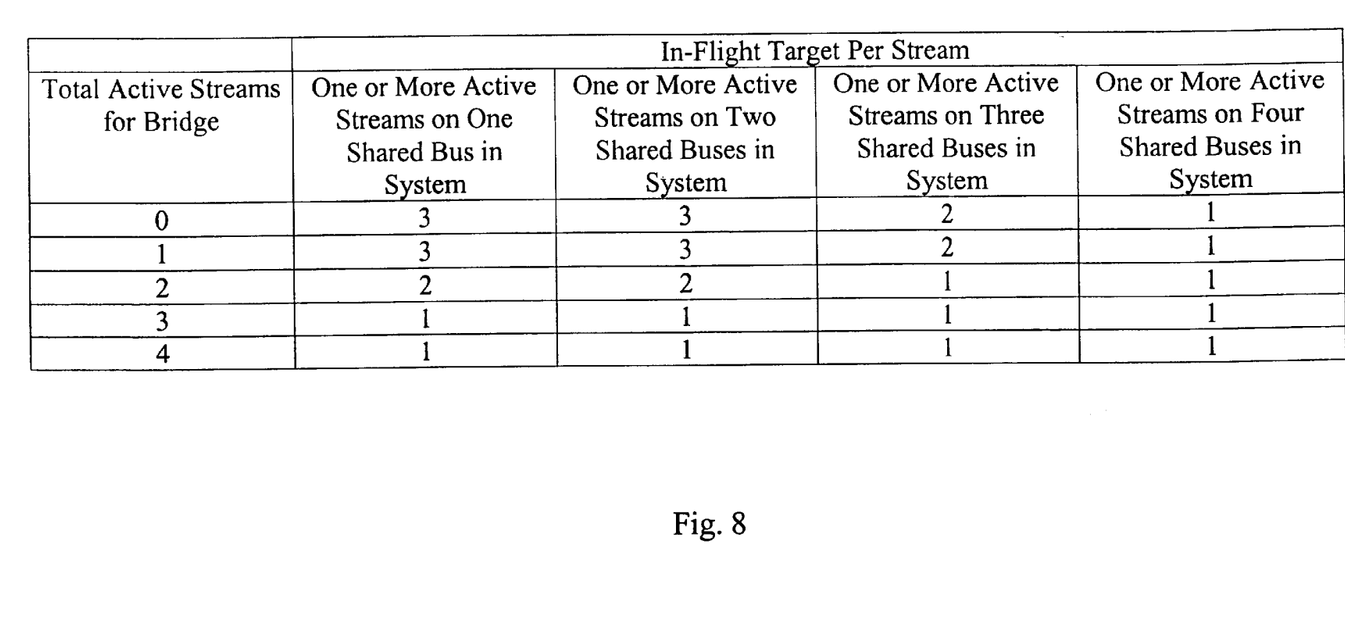
FIG. 8 shows another embodiment of a lookup table in accordance with the present invention.

Referring now to FIG. 8, column one represents the total number of active streams for the bridge. Column two represents the target in-flight packet count when the traffic hints received by the bridge indicate that one shared bus in the system has active streams. Column three represents the target in-flight packet count when the traffic hints received by the bridge indicate that two shared buses in the system have active streams, and so on. The bridge may assume that any shared bus with an active stream is more or less fully utilized, due to the fact that the target in-flight packet count for the shared bus will typically be maintained such that any active stream will utilize close to the full shared bus bandwidth.

An advantage of this approach is that the switch 116 need not implement flow control with the bridges. Instead, bridges self-regulate to maintain total bandwidth on all shared buses to levels sustainable by switch 116.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:

transmitting packets on a bus; and maintaining a number of the packets in-flight on the bus according to a number of active streams for the bus.

2. The method of claim 1 further comprising:

employing a lookup table comprising one or more target in-flight packet counts each corresponding to an active stream count.

3. The method of claim 1 further comprising:

a first prefetch unit transmitting the packets on the bus; and the first prefetch unit maintaining the number of in-flight packets responsive to a number of active streams received from a second prefetch unit.

4. A method comprising:

determining a target in-flight packet count for a bus; and maintaining the target in-flight count by adjusting a number of in-flight packets per stream on the bus.

5. The method of claim 4 further comprising:

employing a lookup table comprising one or more target in-flight packet counts each corresponding to an active stream count.

6. A method comprising:

transmitting first packets on a first bus of a plurality of buses; and maintaining a number of the first packets in-flight on the first bus responsive to a number of the plurality of buses with active streams.

7. The method of claim 6 further comprising:

a first bus bridge transmitting the first packets on the first bus; and the first bus bridge transmitting an indication of active streams on the first bus to a second bus bridge on a second bus of the plurality of buses.

8. An apparatus comprising:

a first circuit to transmit first packets on a bus, each packet of the first packets associated with a stream, the first circuit to maintain a number of in flight packets per stream according to a total number of streams on the bus.

9. The apparatus of claim 8 further comprising:

a second circuit to transmit second packets on a bus, each packet of the second packets associated with a stream, the second circuit to maintain a number of in flight packets per stream according to a total number of streams on the bus.

10. The apparatus of claim 9 further comprising:

a signal path between the first and second circuits by which the circuits may exchange a number of streams associated with the first packets and a number of streams associated with the second packets.

11. The apparatus of claim 8 further comprising:

a lookup table comprising one or more target in-flight packet counts per stream each corresponding to a total number of streams on the bus.

12. An apparatus comprising:

a bus bridge coupled to a memory by way of a bus, the bus bridge to transmit packets to the memory by way of the bus, each packet of the packets associated with a stream, the bus bridge to maintain a number of in-flight packets per stream according to a total number of streams on the bus.

13. The apparatus of claim 12 further comprising:

a lookup table comprising one or more target in-flight packet counts per stream each corresponding to a total number of streams on the bus.

14. An apparatus comprising:

a plurality of buses coupled to a memory; and a bus bridge coupled to the memory by way of a first one of the plurality of buses, the bus bridge to maintain a number of in-flight packets on the first bus according to a number of the plurality of buses with active streams.

15. The apparatus of claim 14 further comprising:

a lookup table comprising one or more target in-flight packet counts each corresponding to a number of the plurality of buses with active streams.

\* \* \* \* \*

UNITED STATES PATENT AND TRADEMARK OFFICE
CERTIFICATE OF CORRECTION

PATENT NO. : 6,487,627 B1
DATED : November 26, 2002
INVENTOR(S) : Willke et al.

It is certified that error appears in the above-identified patent and that said Letters Patent is hereby corrected as shown below:

Column 1,
Line 10, delete "Modem" and insert -- Modern --.

Signed and Sealed this

Twenty-eighth Day of September, 2004

JON W. DUDAS
*Director of the United States Patent and Trademark Office*